United States Patent [19]

Borner

[11] Patent Number: 4,489,608
[45] Date of Patent: Dec. 25, 1984

[54] CYCLE WHEEL MOUNTING FIXTURE
[75] Inventor: Willy Borner, Cupertino, Calif.
[73] Assignee: Balco, Inc., San Jose, Calif.
[21] Appl. No.: 533,136
[22] Filed: Sep. 16, 1983
[51] Int. Cl.³ ............................................ G01M 1/06
[52] U.S. Cl. ..................................................... 73/487
[58] Field of Search ...................... 73/487; 157/14, 15, 157/21

[56] References Cited
U.S. PATENT DOCUMENTS
3,236,105  2/1966  Hamer .................................... 73/487

FOREIGN PATENT DOCUMENTS
44034  3/1980  Japan .................................... 73/487

Primary Examiner—James J. Gill
Attorney, Agent, or Firm—Burns, Doane, Swecker & Mathis

[57] ABSTRACT

A cycle wheel mounting fixture for a dynamic balancing machine includes a first cone that is axially slidable on the spindle of the balancer, with its apex facing towards the distal end of the spindle, to engage the inner surface of a cycle wheel hub. This cone is biased away from the flange by a spring interposed between the flange and the cone. One or more resilient pressure rings surround the spring and cone and bear against the spokes and hub of the wheel. An outer cone engages the outside of the wheel hub and centers the wheel on the spindle along with the inner cone. The bias provided to the inner cone allows it to engage the wheel with adequate supporting pressure but without exerting any damaging forces thereon. The resilient support provided by the pressure rings assures a firm mounting of the wheel on the spindle so that the two rotate in unison without any oscillation that could adversely affect the balance measurement.

22 Claims, 5 Drawing Figures

CYCLE WHEEL MOUNTING FIXTURE

BACKGROUND OF THE INVENTION

1. Field of the Invention

The present invention is generally concerned with dynamic wheel balancers, and more particularly is directed to a fixture for securely supporting a cycle wheel, i.e. a motorcycle wheel, on the spindle of a conventional dynamic wheel balancer, so that the balancer can be used with cycle wheels as well as standard automobile and truck wheels.

2. Description of the Prior Art

Dynamic wheel balancers typically include a rotatable spindle upon which the wheel is mounted during the balancing operation. Force measuring devices, e.g., piezoelectric crystals, detect lateral forces generated by the spindle during its rotation. These forces are caused by imbalance within the wheel, and provide an indication of the amount and location of weights to be added to the wheel to bring it into proper balance. Such balancers can measure in one or two planes. That is, they can determine the amounts of weight to be added in the center plane of the wheel or in two locations on the wheel, most typically the two rims of the wheel. Dynamic balancers of this type are disclosed, for example, in copending U.S. patent application Ser. No. 236,558 filed Feb. 20, 1981, now U.S. Pat. No. 4,435,982, and Ser. No. 444,885, filed Nov. 29, 1982.

Since most dynamic balancers are primarily used for balancing automobile and truck wheels, their spindles are fitted with support structure that facilitates the mounting of such wheels. This support structure generally includes an annular flange that is fixedly attached to the spindle. The flange provides a planar support surface against which the inside of the wheel bears. After the wheel is placed on the spindle, a conically shaped hub is threaded onto the spindle with its apex facing the flange. The hub serves to center the wheel on the spindle as well as force it against the flange, thus providing a stable mount that rigidly secures the wheel to the spindle.

While this mounting arrangement is suitable for standard automobile and truck wheels, it is not particularly adapted for motorcycle wheels and the like. More specifically, the motorcycle wheel does not have a suitable surface that can bear against the flange and receive the force provided thereby when the conical hub is tightened against the outside of the wheel. Rather, the inner circumference of the flange rests against the spokes of the wheel. If the conical hub is tightened against the wheel with sufficient force to hold the wheel firmly in place, the spokes of the wheel can be bent by the inner rigid edge of the flange, resulting in permanent damage to the wheel.

In an effort to circumvent this problem, one prior art adaptor for motorcycle wheels employs a plate or bar that is adjacent the flange and that has fingers which engage the spokes of the wheel. While this arrangement avoids the damaging contact between the flange of the balancer and the spokes of the wheel, it is not totally satisfactory in use. More particularly, it does not provide a sufficiently rigid mounting for the wheel that prevents the wheel from oscillating during rotation, making it difficult to obtain a truly accurate reading of imbalance. If the conical hub of the balancer is tightened against the wheel to reduce oscillation, damage to the wheel can again result from the excessive force placed on the hub of the wheel.

In addition, this type of adapter is awkward and time consuming to use, since the fingers must be separately adjusted for each different type of cycle wheel. Furthermore, its applications are limited to spoked wheels. It cannot be used with solid wheels of the type found on most motor scooters or with light alloy disc wheels that are becoming increasingly popular on motorcycles.

BRIEF STATEMENT OF THE INVENTION

Accordingly, it is an object of the present invention to provide a novel fixture for mounting all types of cycle wheels on the spindle of a conventional dynamic wheel balancer, which fixture provides a sturdy support for the wheel while reducing the likelihood of damage thereto.

In accordance with the present invention, such a cycle wheel mounting fixture comprises a first cone that is axially slidable on the spindle and has its apex facing towards the distal end of the spindle, to engage the inner surface of the a cycle wheel hub. This cone is biased away from the flange by a spring interposed between the flange and the cone. One or more resilient pressure rings surround the spring and cone and bear against the spokes and hub of the wheel. An outer cone engages the outside of the wheel hub and centers the wheel on the spindle along with the inner cone. The bias provided to the inner cone allows it to engage the wheel with adequate supporting pressure but without exerting any damaging forces thereon. The resilient support provided by the pressure rings assures a firm mounting of the wheel on the spindle so that the two rotate in unison without any oscillation that could adversely affect the balance measurement. The resilient pressure rings instantly engage all types of cycle wheels without the need for time consuming adjustment.

Further features and advantages of the invention are described in detail hereinafter with reference to preferred embodiments illustrated in the accompanying drawings.

DESCRIPTION OF THE ILLUSTRATED EMBODIMENT

Figure 1:
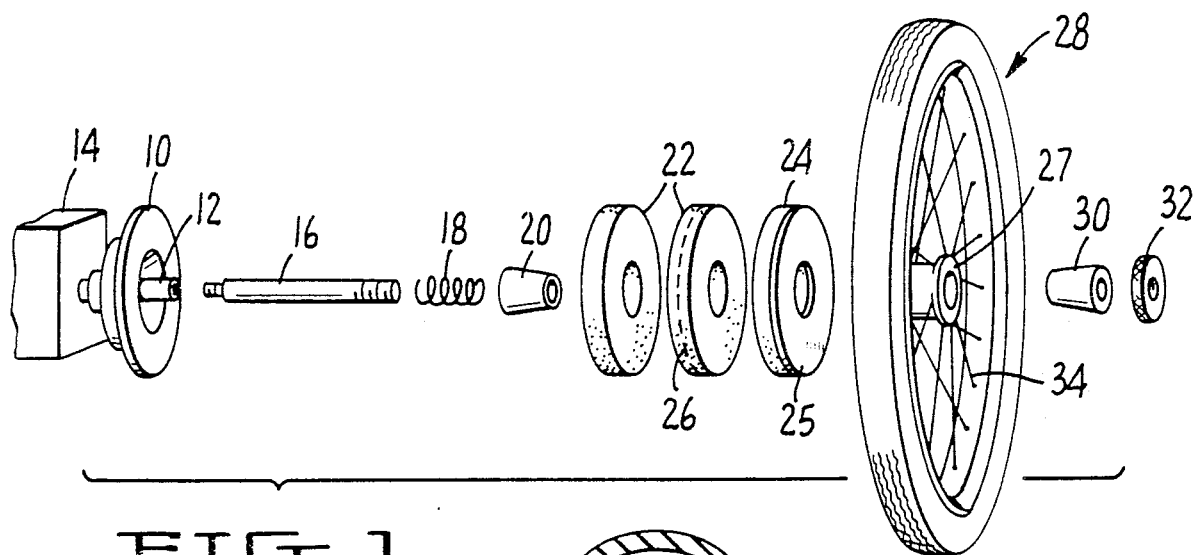
FIG. 1 is a prespective exploded view of one preferred embodiment of the cycle wheel mounting fixture, illustrating the relationship of the various parts in an unassembled state.
Figure 2:
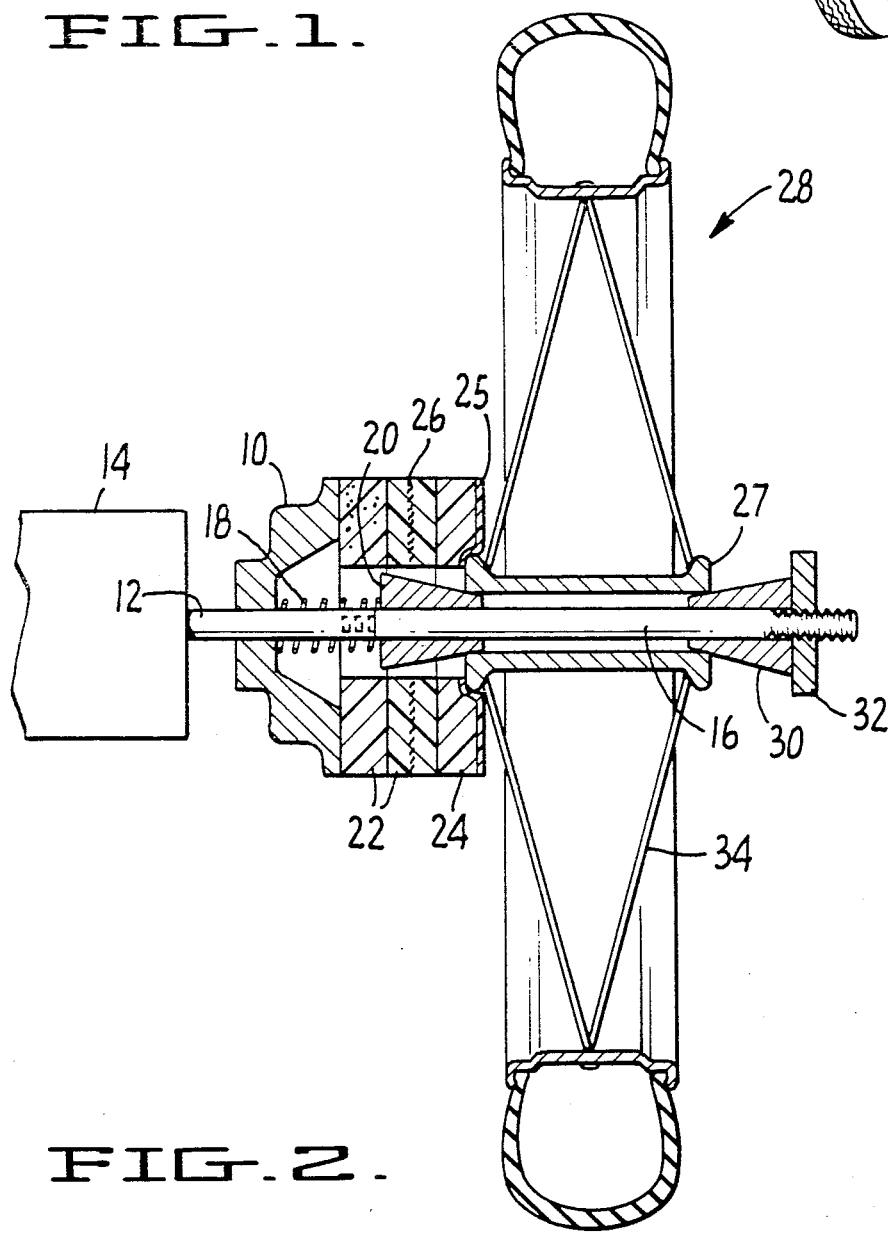
FIG. 2 is a cross-sectional side view of the mounting fixture of FIG. 1 and a motorcycle wheel mounted on the spindle of a dynamic wheel balancer.

Referring to FIGS. 1 and 2, an annular flange plate 10 is rigidly connected to the shaft 12 of a conventional dynamic wheel balancer. The shaft is mounted for rotation in a housing 14 which contains the force measuring elements (not shown) of the balancer. A spindle 16 is connected to the end of the shaft that projects from the housing 14 and provides a support for the wheel to be balanced. Preferably, as shown in FIG. 1, the spindle 16 is removable from the shaft to enable different sizes of spindles to be used with different types of wheels.

The cycle wheel fixture includes a compression spring 18 that surrounds the spindle 16 and bears at one end against a recessed surface of flange 10. The spring 18 has a sufficient length to project a reasonable distance beyond the outer plane of the flange. An inner cone 20 having a central bore is placed on the spindle with its base surface resting against the spring 18 and its truncated apex facing the distal end of the spindle 16.

A series of pressure rings 22 and 24 are placed on the spindle, surrounding the spring 18 and inner cone 20, with the innermost ring 22 resting against the flange 10. These rings are resilient and deformable. They can be deformable inflated rings filled with a fluid, especially a gas or as shown in this Figure they can be made of an elastomeric material which is preferably of a foam of closed cell structure so that oil and grease are not retained thereby. The material should be of light weight so that it will have negligible effect on the balance measurement, particularly if it should run out, i.e., expand radially, during rotation. Neoprene foam is one material which is particularly well-suited for the pressure rings. The outer ring 24 has a rubber (such as neoprene) layer 25 laminated to its outer surface to repel grease and oil and increase the ring durability. Of course, it will be appreciated that if the rings are constructed entirely of a material that does not absorb grease, such as nonfoam rubber, the laminated outer layer can be eliminated.

One or more of the rings 22 and 24 can be provided with a central reinforcement of a stiffening material. For example, a layer of fiberglass 26 can be sandwiched between two neoprene layers to provide a stiffer pressure ring.

Although three pressure rings are illustrated in use in the FIGS. 1 and 2, it will be appreciated that a greater or lesser number of rings can be employed depending, for example, on the thickness of individual rings and the amount of axial compression that is required. It will also be appreciated that a combination of foam and inflatable pressure rings can be used.

The outside of the hub 27 for the cycle wheel 28 is supported on the spindle 18 by an outer bored cone 30. This cone is maintained in its axial position on the spindle, in engagement with the hub 27, by means of a load nut 32 that is threaded onto the spindle. In the alternative, the outer cone 30 can be provided with internal threads to attach it directly to the spindle and thereby eliminate the nut 32.

In operation, the spring 18 and inner cone 20 are assembled on the spindle 16, and the pressure rings 22, 24 are placed over the spring and cone. The cycle wheel 28 is then placed on the spindle, with the inner cone 20 engaging the left side of the inner cylindrical surface of the hub 27, as viewed in FIG. 2. The outer cone 30 is then slipped onto the spindle so as to engage the other side of the inner cylindrical surface of the hub, thereby centering the wheel 28 on the spindle 16. The load nut 32 is then tightened to move the two cones and the wheel to the left, as viewed in FIG. 2, compressing the spring 18 until the pressure rings 22 and 24 conform to and engage the wheel and exert sufficient pressure thereon to prevent the wheel from rotating relative to the spindle.

As shown in FIG. 2, the outer pressure ring 24 bears against the hub 27 and spokes 34 of the wheel. However, if the wheel includes an integral drive sprocket or brake disk (not shown), the pressure ring can conform to and engage this structure instead of, or in addition to, the spokes.

From the foregoing it will be appreciated that the present invention provides a sturdy mounting for a cycle wheel without exerting forces on the wheel which could prove to be potentially damaging. The axial movement of the inner cone 20 that is permitted by the bias spring enables the two cones 20 and 30 to adequately center the wheel on the spindle without exerting undue axial force on the hub. This force is limited to that provided by the spring. In combination with this feature, the axial compression afforded by the pressure rings provide positive yet resilient engagement between the wheel and the flange, so that the wheel and spindle rotate in unison without damage to the spokes.

Figure 3:
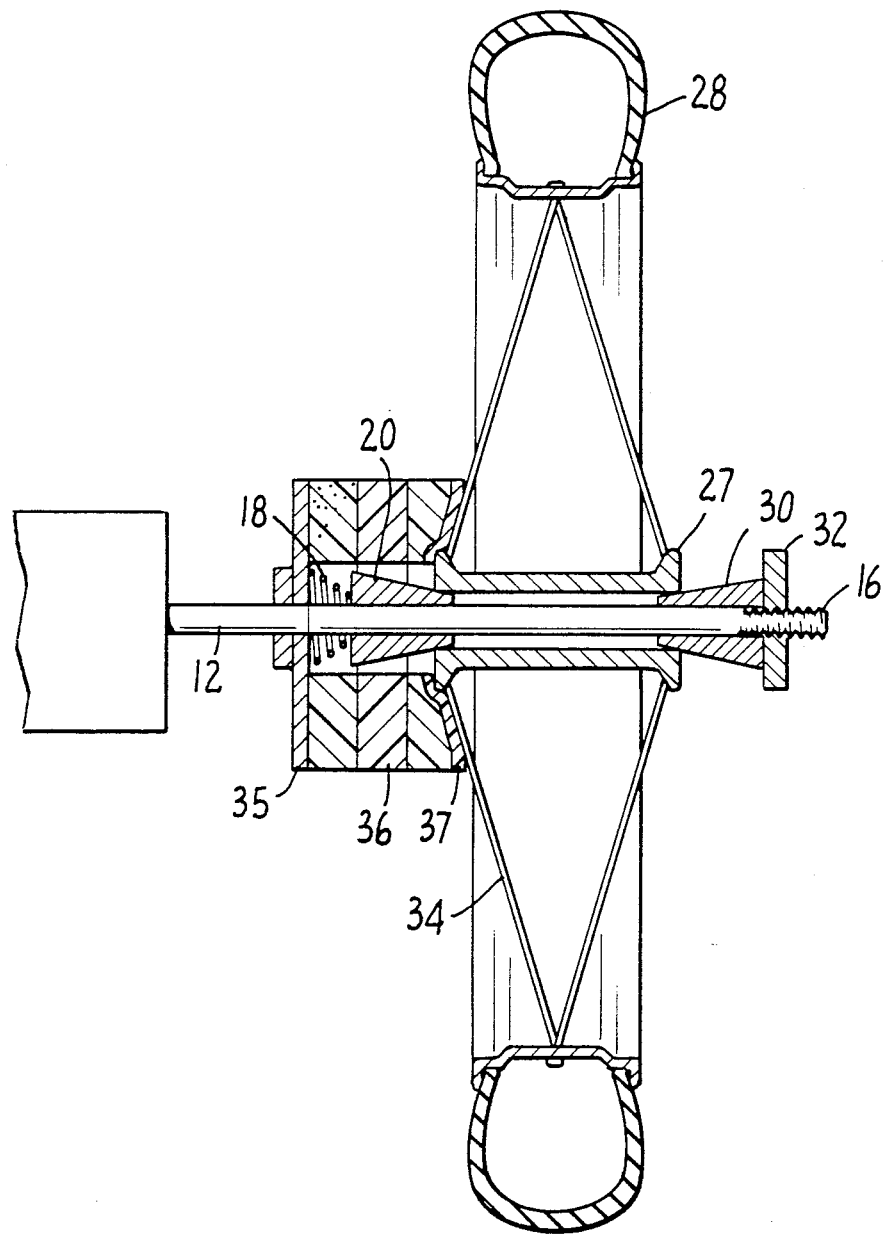
FIG. 3 is a cross-sectional side view similar to that of FIG. 2, illustrating a second embodiment of the mounting fixture.

Other embodiments of the invention are available which provide the same advantageous results. For example, as shown in FIG. 3, the mounting fixture can comprise a flat flange 35 having bonded thereto a pressure ring 36 and outer layer 37, for example a neoprene foam ring with a neoprene rubber outer layer, bonded thereto. It will be noted that the flange 35 is of a planar configuration, rather than being recessed as was flange 10 in the embodiment in FIG. 2. In operation, the plate 35 and integral pressure ring 36 are substituted for the disk-shaped mounting flange 10 and removable pressure rings 22 and 24.

Spring 18 can be a conical spring as shown in FIG. 3 especially when a flat flange is employed to maximize travel of cone 20 and minimize interference when the spring is compressed.

Figure 4:
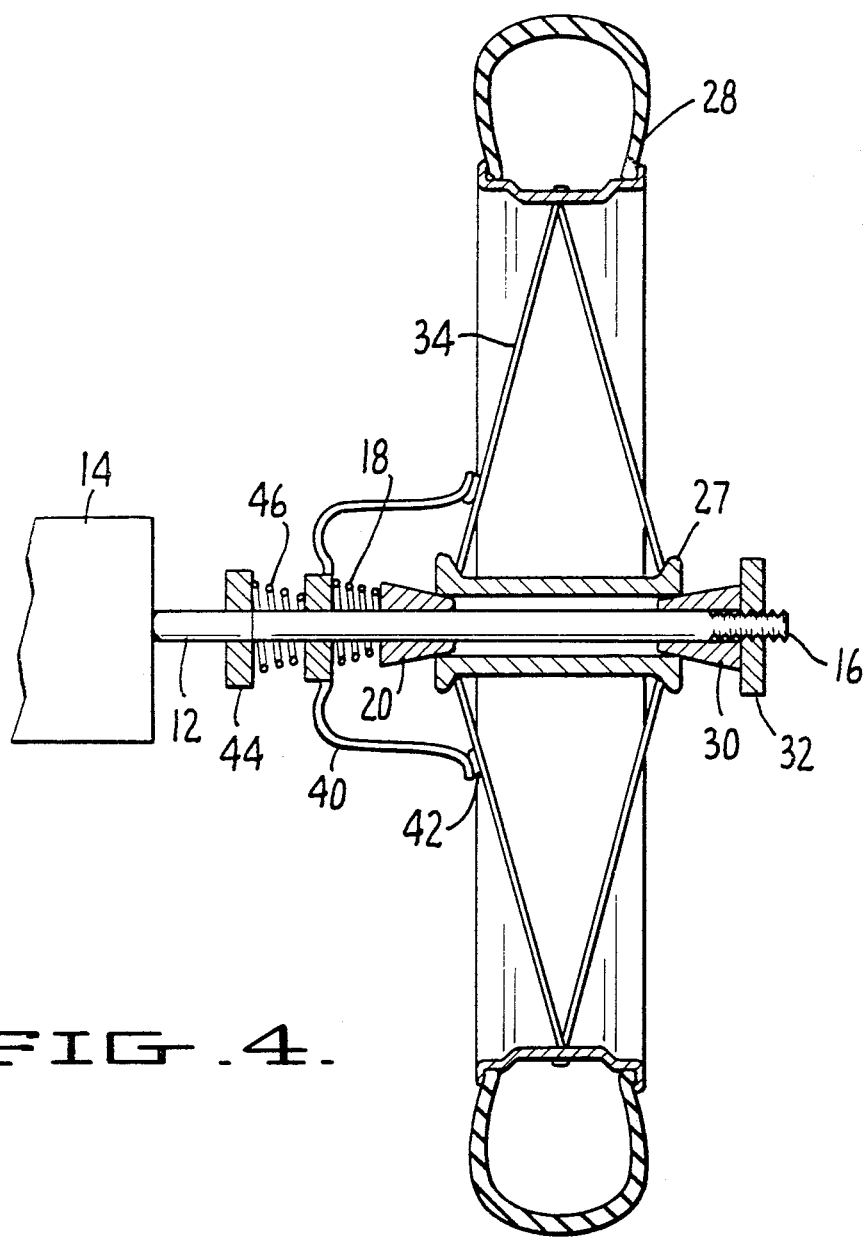
FIG. 4 is a cross-sectional side view of a third embodiment of the invention.

Other variations of pressure rings can be employed within the context of the invention. For example, rather than being disk-shaped structures as shown in FIGS. 1–3, the pressure ring could be an inflatable elastomeric tube of appropriate size to be interposed between the flange 10 and the wheel. Alternatively, as shown in FIG. 4 the axial compression function that is served by the pressure rings can be incorporated into the structure of the flange itself. More particularly, rather than constructing the flange from a rigid metal such as steel or aluminum, it can be a dished structure made of a strong yet flexible material, such as a suitable spring steel, a deformable plastic or the like. If the flange made of resilient material is capable of being axially compressed under engagement with the wheel, the individual pressure rings can be dispensed with. In such an embodiment flange 10 is replaced by deformable resilient dished plate 40. The surface of dished plate 40 which engages spokes 34 of wheel 28 can be covered with a layer 42 of rubber or the like to assist in the engagement of the spokes while protecting them. Spring 18 is located between plate 40 and cone 20 in the same relation as it was between flange 10 and cone 20 in the embodiment of FIGS. 1 and 2. Plate 40 can be fixed to shaft 12 or spindle 16. In the embodiment shown, it may optionally move axially but not radially on shaft 12 or spindle 16. Such motion can be controlled by a keyway or the like which is not shown. When plate 40 can move axially it may be advantageous to locate a backing flange 44 on shaft 10 or spindle 16 and interpose an additional compression spring 46 on shaft 12 or spindle 16 between the backing flange 44 and plate 40 so as to provide additional axial compression to engage the wheel and hold it firmly in place.

Figure 5:
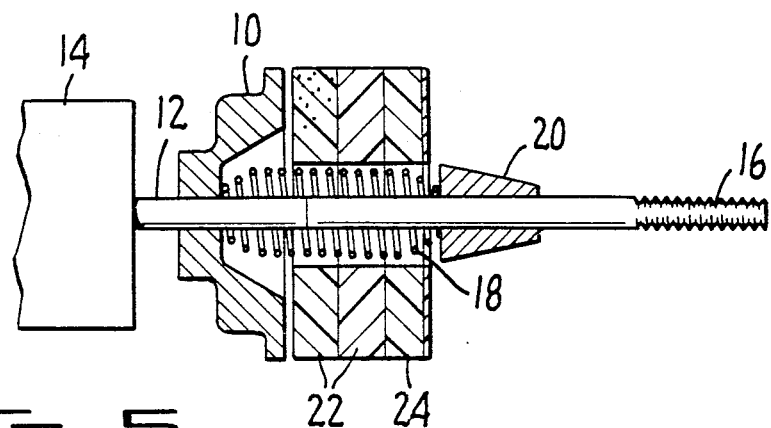
FIG. 5 is a cross-sectioned partially exploded view of an alternative spring configuration that can be used.

Another variation in the embodiment shown in FIGS. 1 and 2 relates to the spring 18. As shown in FIG. 5 the spring of this embodiment can have a double taper, being of narrow diameter at its two ends and wide diameter in the center thereof. The diameter of the spring at its ends is chosen so that it fits comfortably on the spindle 12 without too much radial play. The wide diameter of the spring in its center is related to the inside diameter of the pressure rings 22, 24, so as to engage and center the rings relative to the spindle. This arrangement facilitates the mounting of the wheel on the balancer, since the spring keeps the pressure rings properly positioned and frees the operator from having to be concerned with centering them while mounting the wheel.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A mounting fixture for enabling a cycle wheel to be positively mounted without damage on the spindle of a dynamic wheel balancer having a flange which provides a support plane, comprising:
    first and second means for respectively engaging the opposite ends of the hub of a cycle wheel and centering the wheel on said spindle;
    means for resiliently biasing one of said wheel engaging and centering means in an axial direction along said spindle towards the other of said wheel engaging and centering means; and
    at least one axially compressible pressure ring adapted to be coaxially supported on said spindle between said flange and a cycle wheel and thereby provide positive yet resilient engagement between said flange and said wheel such that the wheel and the spindle rotate in unison.

2. The fixture of claim 1 wherein said wheel engaging and centering means each comprises a cone adapted to be supported on the spindle.

3. The fixture of claim 2 wherein said biasing means comprises a compression spring that is interposed between one of said cones and the flange when said adaptor is assembled on the balancer.

4. The fixture of claim 3 wherein said spring has a double taper, being of narrowest diameter at its ends and widest diameter intermediate said ends.

5. The fixture of claim 4 wherein said pressure ring surrounds said spring and said one cone when the fixture is assembled on the balancer.

6. The fixture of claim 3 wherein said compression spring is coaxial with said spindle when said fixture is assembled on the balancer.

7. The fixture of claim 6 wherein said pressure ring surrounds said spring and said one cone when the fixture is assembled on the balancer.

8. The fixture of claim 1 wherein said pressure ring comprises a disk made of an elastomeric material.

9. The fixture of claim 8 wherein said elastomeric material is neoprene.

10. The fixture of claim 8 wherein said pressure ring includes a reinforcing layer.

11. The fixture of claim 8 wherein one face of said ring is provided with a protective layer of grease-resistant material.

12. The fixture of claim 11 wherein said grease-resistant material is rubber.

13. The fixture of claim 1 wherein at least two pressure rings are interposed in series between the flange and the wheel.

14. The fixture of claim 1 wherein said ring is bonded to said flange.

15. The fixture of claim 1 wherein said ring is separable from said flange.

16. The fixture of claim 1 wherein said ring comprises an inflatable tube.

17. A mounting fixture for enabling a cycle wheel to be positively mounted without damage on the spindle of a dynamic wheel balancer, comprising:
    first and second means for respectively engaging the opposite ends of the hub of a cycle wheel and centering the wheel on said spindle;
    means for resiliently biasing one of said wheel engaging and centering means in an axial direction along said spindle towards the other of said wheel engaging and centering means; and
    axially compressible means adapted to be coaxially supported on said spindle to rotate therewith and engage a cycle wheel to thereby provide positive yet resilient engagement between said flange and said wheel such that the wheel and the spindle rotate in unison.

18. The fixture of claim 17 wherein said wheel engaging and centering means each comprises a cone adapted to be supported on the spindle and said biasing means comprises a compression spring that is interposed between one of said cones and said axially compressible means when said adaptor is assembled on the balancer.

19. The fixture of claim 18 wherein said spring is double tapered, being of narrow diameter at its two ends and wider diameter intermediate said two ends.

20. The fixture of claim 17 wherein said axially compressible means comprises a plate adapted to be mounted on the spindle and a resilient ring bonded thereto.

21. The fixture of claim 17 wherein said axially compressible means comprises an inflatable tube.

22. The fixture of claim 17 wherein said axially compressible means comprises a dished plate having an outer surface adapted to engage a wheel mounted on the spindle, said dished plate being made of a resilient material.

* * * * *